United States Patent
Ho et al.

(10) Patent No.: US 07,000,053 B2
(45) Date of Patent: Feb. 14, 2006

(54) COMPUTER SYSTEM HAVING A HOT SWAPPABLE HOT SWAP CONTROLLER

(75) Inventors: Raymond K. Ho, San Jose, CA (US); Victor E. Jochiong, Mill Valley, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 642 days.

(21) Appl. No.: 09/916,882

(22) Filed: Jul. 26, 2001

(65) Prior Publication Data

US 2003/0023802 A1 Jan. 30, 2003

(51) Int. Cl.
*G06F 13/00* (2006.01)
*G06F 11/00* (2006.01)
*H05K 7/10* (2006.01)

(52) U.S. Cl. .............................. 710/302; 710/301; 714/5
(58) Field of Classification Search ...................... 710/8, 710/10, 104, 301–305; 714/5, 10, 11, 13
See application file for complete search history.

(56) References Cited

U.S. PATENT DOCUMENTS

| | | | | |
|---|---|---|---|---|
| 6,026,458 A | * | 2/2000 | Rasums | 710/302 |
| 6,145,099 A | * | 11/2000 | Shindou | 714/37 |
| 6,260,092 B1 | * | 7/2001 | Story et al. | 710/315 |
| 6,324,485 B1 | * | 11/2001 | Ellis | 702/117 |
| 6,591,324 B1 | * | 7/2003 | Chen et al. | 710/302 |

OTHER PUBLICATIONS

PCI Local Bus Specification, Production Version, Revision 2.1. Jun. 1, 1995. Chapters 1 and 2, pp. 1–19.*

* cited by examiner

Primary Examiner—Mark H. Rinehart
Assistant Examiner—Thomas J. Cleary
(74) Attorney, Agent, or Firm—Meyertons Hood Kivlin Kowert & Goetzel, P.C.

(57) ABSTRACT

A computer system is adapted for dynamic replacement of a hot swap controller card. The computer system includes a circuit board, with the computer system comprising a first slot and a second slot coupled to the circuit board. The first slot includes a first connector and the second slot includes a second connector. The first and second connectors each have a column and row arrangement of connector-pins, with the first connector including first, second and third connector-pins and the second connector including fourth, fifth and sixth connector-pins. First, second, third, fourth, fifth and sixth signal lines are connected to the first through sixth connector-pins, respectively. A primary hot swap controller has a first means for simultaneously turning on/off a first plurality of switches, a second means for driving signal lines connected to the first, second, fourth, and fifth connector-pins, and a third means for storing a status information of the signal lines. A backup hot swap controller has a fourth means for simultaneously turning on/off a second plurality of switches, a fifth means for driving the signal lines connected to the first, second, fourth, and fifth connector-pins and for storing a status information of the signal lines. During a normal operation of the computer system, the first means turns on the first plurality of switches such that the second means drives the signal lines connected to the first, second, fourth, and fifth connector-pins and the fourth means turns off the second plurality of switches. During a backup operation of the computer system, the first means turns off the first plurality of switches and the fourth means turns on the second plurality of switches such that the fifth means drives the signal lines connected to the first, second, fourth, and fifth connector-pins according to the status information stored in the fifth means.

24 Claims, 10 Drawing Sheets

| PIN | Z | A | B | C | D | E | F | |
|---|---|---|---|---|---|---|---|---|
| 22 | GND | XXX | XXX | XXX | XXX | XXX | GND | 404e |
| 21 | GND | XXX | XXX | XXX | XXX | XXX | GND | 404e |
| 3–20 | GND | YYY | YYY | YYY | YYY | YYY | GND | 404e |
| 2 | GND | XXX | XXX | XXX | XXX | XXX | GND | 404e |
| 1 | GND | XXX | XXX | XXX | XXX | XXX | GND | 404e |
| 22 | GND | XXX | XXX | XXX | XXX | XXX | GND | 404d |
| 21 | GND | XXX | XXX | XXX | XXX | XXX | GND | 404d |
| 3–20 | GND | YYY | YYY | YYY | YYY | YYY | GND | 404d |
| 2 | GND | XXX | XXX | XXX | XXX | XXX | GND | 404d |
| 1 | GND | XXX | XXX | XXX | XXX | XXX | GND | 404d |
| 22 | GND | XXX | XXX | XXX | XXX | XXX | GND | 404c |
| 21 | GND | XXX | XXX | XXX | XXX | XXX | GND | 404c |
| 3–20 | GND | YYY | YYY | YYY | YYY | YYY | GND | 404c |
| 2 | GND | XXX | XXX | XXX | XXX | XXX | GND | 404c |
| 1 | GND | XXX | XXX | XXX | XXX | XXX | GND | 404c |
| 22 | GND | GA4 | GA3 | GA2 | GA1 | GA0 | GND | 404b |
| 21 | GND | CLK6 | GND | RSV | RSV | RSV | GND | 404b |
| 3–20 | GND | YYY | YYY | YYY | YYY | YYY | GND | 404b |
| 2 | GND | CLK2 | CLK3 | SYSEN# | GNT2# | REQ3# | GND | 404b |
| 1 | GND | CLK1 | GND | REQ1# | GNT1# | REQ2# | GND | 404b |
| 16–22 | GND | YYY | YYY | YYY | YYY | YYY | GND | 404a |
| 15 | GND | 3.3v | FRAME# | IRDY# | BD_SELECT# | TRDY# | GND | 404a |
| 6–14 | GND | YYY | YYY | YYY | YYY | YYY | GND | 404a |
| 5 | GND | BRSVP1A5 | BRSVP1B5 | BD_RESET# | GND | GNT# | GND | 404a |
| 4 | GND | BRSVP1B5 | BD_HEALTHY# | V(I/O) | INTP | INTS | GND | 404a |
| 2–3 | GND | YYY | YYY | YYY | YYY | YYY | GND | 404a |
| 1 | GND | 5v | −12v | TRST# | +12v | 5v | GND | 404a |

| PIN | F | E | D | C | B | A | Z | |
|---|---|---|---|---|---|---|---|---|
| 22 | GND | XXX | XXX | XXX | XXX | XXX | GND | |
| 21 | GND | XXX | XXX | XXX | XXX | XXX | GND | |
| 3-20 | GND | YYY | YYY | YYY | YYY | YYY | GND | 408e |
| 2 | GND | XXX | XXX | XXX | XXX | XXX | GND | |
| 1 | GND | XXX | XXX | XXX | XXX | XXX | GND | |
| 22 | GND | XXX | XXX | XXX | XXX | XXX | GND | |
| 21 | GND | YYY | YYY | YYY | YYY | YYY | GND | |
| 3-20 | GND | XXX | XXX | XXX | XXX | XXX | GND | 408d |
| 2 | GND | XXX | XXX | XXX | XXX | XXX | GND | |
| 1 | GND | XXX | XXX | XXX | XXX | XXX | GND | |
| 22 | GND | XXX | XXX | XXX | XXX | XXX | GND | |
| 21 | GND | XXX | XXX | XXX | XXX | XXX | GND | |
| 3-20 | GND | XXX | XXX | XXX | XXX | XXX | GND | 408c |
| 2 | GND | YYY | YYY | YYY | YYY | YYY | GND | |
| 1 | GND | XXX | XXX | XXX | XXX | XXX | GND | |
| 22 | GND | GA0 | GA1 | GA2 | GA3 | GA4 | GND | |
| 21 | GND | RSV | RSV | RSV | GND | CLK6 | GND | |
| 3-20 | GND | YYY | YYY | YYY | YYY | YYY | GND | 408b |
| 2 | GND | REQ3# | GNT2# | SYSEN# | CLK3 | CLK2 | GND | |
| 1 | GND | REQ2# | GNT1# | REQ1# | GND | CLK1 | GND | |

COMPUTER SYSTEM HAVING A HOT SWAPPABLE HOT SWAP CONTROLLER

BACKGROUND OF THE INVENTION

1. Field of the Invention

The present invention relates to a Compact Peripheral Component Interconnect ("CPCI") computer system. More particularly, the present invention relates to a CPCI system that is adapted for dynamic replacement of a hot swap controller.

2. Description of Related Art

CPCI is a high performance industrial bus based on the standard PCI electrical specification in rugged 3U or 6U Eurocard packaging. CPCI is intended for application in telecommunications, computer telephony, real-time machine control, industrial automation, real-time data acquisition, instrumentation, military systems or any other application requiring high speed computing, modular and robust packaging design, and long term manufacturer support. Because of its extremely high speed and bandwidth, the CPCI bus is particularly well suited for many high-speed data communication applications such as servers, routers, converters, and switches.

Compared to standard desktop PCI, CPCI supports twice as many PCI slots (8 versus 4) and offers a packaging scheme that is much better suited for use in industrial applications. Conventional CPCI cards are designed for front loading and removal from a card cage. The cards are firmly held in position by their connector, card guides on both sides, and a faceplate that solidly screws into the card cage. Cards are mounted vertically allowing for natural or forced air convection for cooling. Also, the pin-and-socket connector of the CPCI card is significantly more reliable and has better shock and vibration characteristics than the card edge connector of the standard PCI cards.

Conventional CPCI defines a backplane environment that is limited to eight slots. More specifically, the bus segment of the conventional CPCI system is limited to eight slots, which includes a system slot and peripheral slots. The system slot provides the clocking, arbitration, configuration, and interrupt processing for up to seven peripheral slots.

The newest trend in CPCI systems is to include a hot swap controller so as to support hot swappable front cards. The hot swap controller allows a user to plug and unplug a hot swappable front card while the system remains on. In other words, the hot swap controller allows a user to exchange hot swappable front cards while the system is running so that there is no need to reboot the system. The CPCI Hot Swap/HA Specification defines, among other things, that the connector-pin P1-D15 (in the backplane) and connector-pin J1-D15 (in the front card) be designated as a BD_SELECT# line. The hot swap controller drives the BD_SELECT# line to detect the insertion of a hot swappable front card into a slot of the backplane, and to power-up/power-down the front card. The Specification further defines the dynamic interface protocol between the system's hot swap controller and the front card through this line.

Although conventional CPCI systems that include the hot swap controller allow for the dynamic replacement of hot swappable front cards, they do not allow for the dynamic replacement of the hot swap controller. This means that if the hot swappable controller is defective then the CPCI system would need to be shut down to replace the defective hot swap controller, and power-cycling or resetting of the system would be required. There are many instances where shutting down the system in order to replace a defective hot swap controller would be harmful. For example, if a CPCI system is being used as part of a telecommunications system, then it is required to shut down the entire telecommunications system in order to replace the defective hot swap controller. This means that users of the system would not be able to access the system during the replacement process such that it greatly inconveniences the users of the system.

Accordingly, it would be desirable to provide a CPCI system that is adapted to provide dynamic replacement of the hot swap controller.

SUMMARY OF THE INVENTION

The present invention relates to a computer system that is adapted for the dynamic replacement of a hot swap controller card. The computer system includes a primary hot swap controller for driving the signal lines connected to the connector-pins of a hot swappable front card. Also included is a backup hot swap controller that stores the status information of the signal lines at programmed intervals so that during the replacement process the backup hot swap controller drives the signal lines according to the stored status information. The present invention provides the important advantage of not having to shut down the system during the replacement process.

In an embodiment of the invention, a computer system includes a circuit board, with the computer system comprising a first slot and a second slot coupled to the circuit board. The first slot includes a first connector and the second slot includes a second connector. The first and second connectors each have a column and row arrangement of connector-pins, with the first connector including first, second and third connector-pins and the second connector including fourth, fifth and sixth connector-pins. First, second, third, fourth, fifth and sixth signal lines are connected to the first through sixth connector-pins, respectively. A primary hot swap controller has a first means for simultaneously turning on/off a first plurality of switches, a second means for driving signal lines connected to the first, second, fourth, and fifth connector-pins, and a third means for storing a status information of the signal lines. A backup hot swap controller has a fourth means for simultaneously turning on/off a second plurality of switches, a fifth means for driving the signal lines connected to the first, second, fourth, and fifth connector-pins and for storing a status information of the signal lines. During a normal operation of the computer system, the first means turns on the first plurality of switches such that the second means drives the signal lines connected to the first, second, fourth, and fifth connector-pins and the fourth means turns off the second plurality of switches. During a backup operation of the computer system, the first means turns off the first plurality of switches and the fourth means turns on the second plurality of switches such that the fifth means drives the signal lines connected to the first, second, fourth, and fifth connector-pins according to the status information stored in the fifth means.

In another embodiment of the invention, a hot swappable computer system includes a circuit board. The circuit board has a slot with a first connector, and the first connector has connector-pins in a column and row arrangement and including first, second and third connector-pins, with the computer system comprising first, second and third signal lines, wherein the first, second, and third connector-pins are connected to the first, second, and third signal lines, respectively. A primary hot swap controller has a core control circuit including a first register, a plurality of first switches, a first communication control circuit, and an arbitration control circuit. The core control circuit is connected to the plurality of first switches and the arbitration control circuit. The arbitration control circuit is connected to the first communication control circuit and to activation terminals of the first switches via a common control line such that the first switches are turned on/off simultaneously by the arbitration control circuit. A backup hot swap controller has a second register, a plurality of second switches, and a second communication control circuit, with the second register connected to the second switches and the second communication control circuit. The second communication control circuit is connected to respective activation terminals of the second switches via a common control line such that the second switches are turned on/off simultaneously by the second communication control circuit. The second communication control circuit has a communication link with the first communication control circuit, wherein during a normal operation, the primary hot swap controller drives said first, second, and third signal lines. During a backup operation, the backup hot swap controller drives the first, second, and third signal lines according to a status information of the respective signal lines stored in the second register.

In yet another embodiment of the invention, a backup hot swap controller for use in a hot swappable computer system includes a circuit board including slots with connectors that have a column and row arrangement of connector-pins. First ones of the connectors of the slots have first, second and third connector-pins, with the backup hot swap controller comprising a plurality of switches, respective ones of the switches connected to the first, second, and third connector-pins via signal lines. A register is providing for storing status information about the signal lines, with the register being connected to the plurality of switches. A communication control circuit is connected to the register, and the communication control circuit is connected to respective activation terminals of the switches and has a common control line for simultaneously turning on/off of the plurality of switches. During a period when the communication control circuit turns on the switches, the register drives the signal lines connected to the first, second and third connector-pins according to the status information stored in the register.

A more complete understanding of the present invention will be afforded to those skilled in the art, as well as a realization of additional advantages and objects thereof, by a consideration of the following detailed description of the embodiment. Reference will be made to the appended sheets of drawings, which will first be described briefly.

BRIEF DESCRIPTION OF THE DRAWINGS

FIG. 6(a) shows a front view of a conventional pin out arrangement of the connectors of a slot;

FIG. 6(b) shows a back view of a conventional pin out arrangement of connectors of a slot;

DETAILED DESCRIPTION

The present invention relates to a CPCI system that is adapted to provide dynamic replacement of a hot swap controller. In a conventional CPCI system, dynamic replacement of the hot swap controller card is not allowed so that the CPCI system would need to be shut down during replacement of the hot swap controller. It would be desirable to provide a CPCI system that allows for the dynamic replacement of the hot swap controller card, since this would allow the CPCI system to continue running applications and allow users to access the system even though the hot swap controller card is being replaced.

Figure 1:
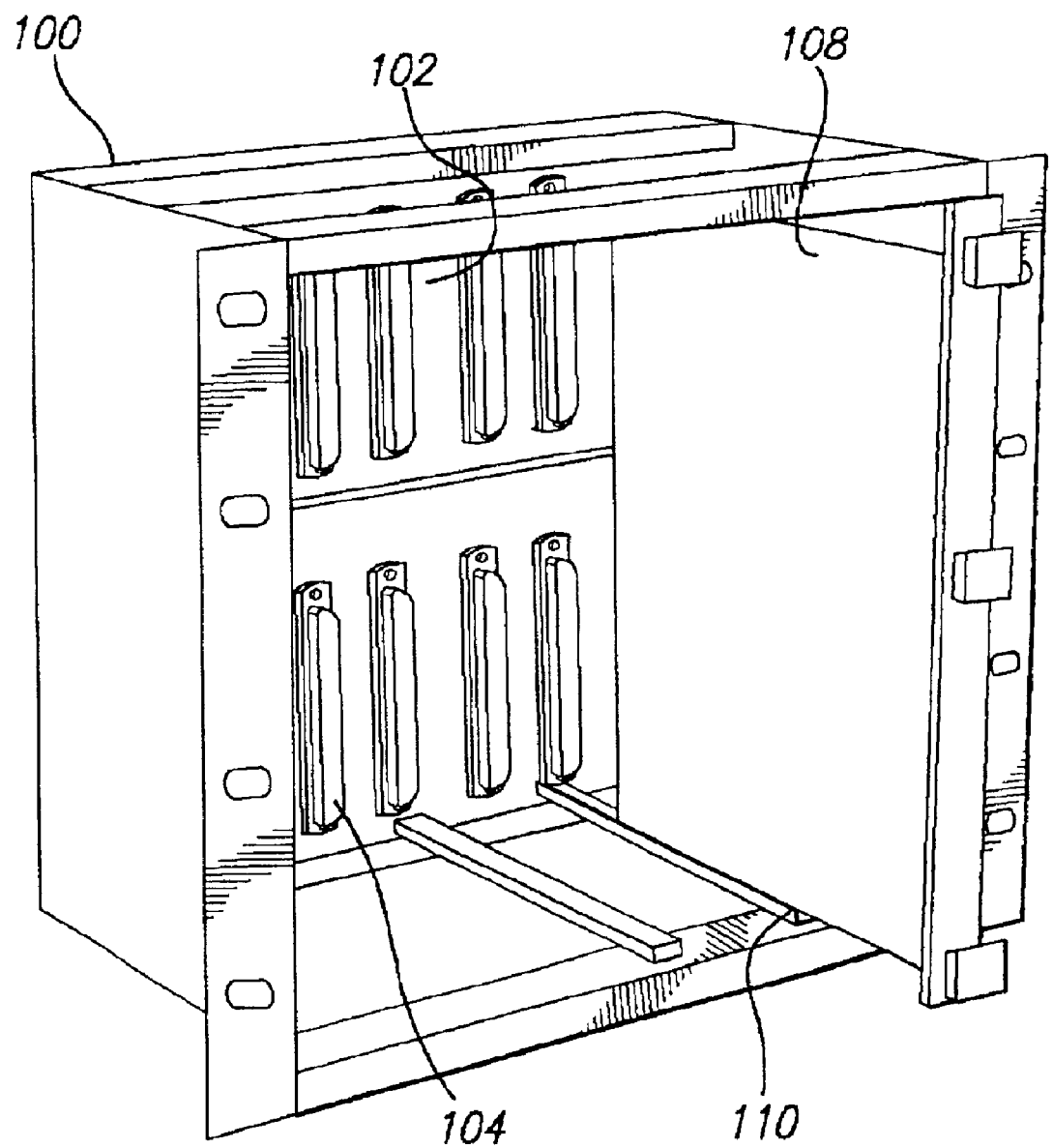
FIG. 1 is a perspective view of a conventional CPCI chassis system.

Referring to FIG. 1, there is shown a perspective view of a conventional CPCI chassis system. The chassis system 100 includes a CPCI circuit board referred to in the conventional CPCI system as a passive backplane 102 since the circuit board is located at the back of the chassis 100 and add-on cards ("front cards") can only be inserted from the front of the chassis 100. On the front side of the backplane 102 are slots provided with connectors 104. In the conventional chassis system 100 that is shown, a 6U daughter card 108 may be inserted into appropriate slots and mate with the connectors 104. For proper insertion of the daughter cards 108 into the slots, card guides 110 are provided. This conventional chassis system 100 provides front removable daughter cards and unobstructed cooling across the entire set of daughter cards 108.

Figure 2:
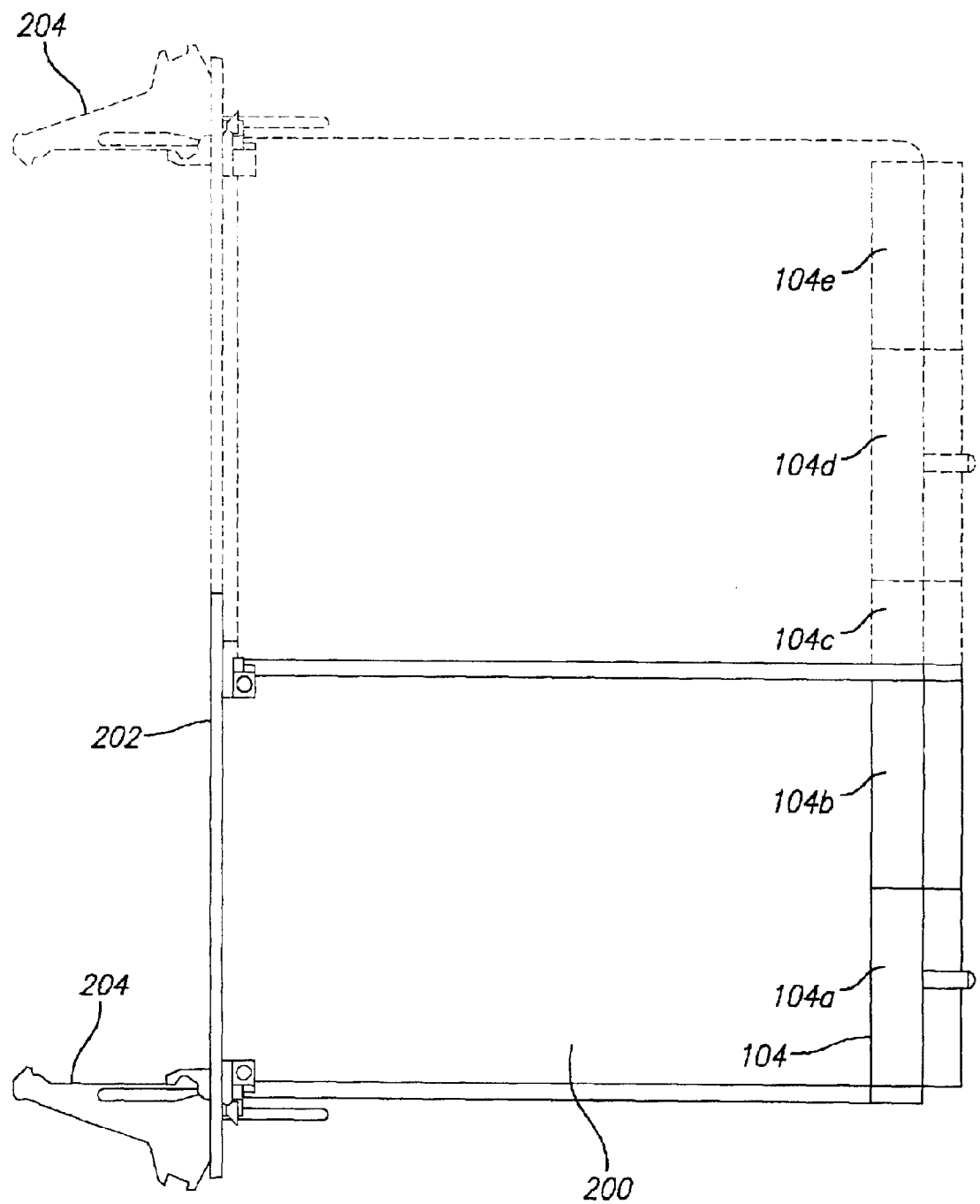
FIG. 2 shows the form factors that are defined for the CPCI front card.

Referring to FIG. 2, there are shown the form factors defined for the CPCI daughter card, which is based on the Eurocard industry standard. As shown in FIG. 2, the daughter card 200 has a front plate interface 202 and ejector/injector handles 204. The front plate interface 202 is consistent with Eurocard packaging and is compliant with IEEE 1101.1 or IEEE 1101.10. The ejector/injector handles should also be compliant with IEEE 1101.1. One ejector/injector handle 204 is used for 3U daughter cards, and two ejector/injector handles 204 are used for 6U daughter cards. The connectors 104a–104e of the daughter card 200 are numbered starting from the bottom connector 104a, and both 3U and 6U daughter card sizes are defined, as described below.

The dimensions of the 3U form factor are approximately 160.00 mm by approximately 100.00 mm, and the dimensions of the 6U form factor are approximately 160.00 mm by approximately 233.35 mm. The 3U form factor includes two 2 mm connectors 104a–104b, and is the minimum as it accommodates the full 64 bit CPCI bus. Specifically, the 104a connectors are reserved to carry the signals required to support the 32–bit PCI bus, hence no other signals may be carried in any of the pins of this connector. Optionally, the 104a connectors may have a reserved key area that can be provided with a connector "key", which is a pluggable plastic piece that comes in different shapes and sizes, so that the add-on card can only mate with an appropriately keyed slot. The 104b connectors are defined to facilitate 64-bit transfers or for rear panel I/O in the 3U form factor. The 104c–104e connectors are available for 6U systems as also shown in FIG. 1. The 6U form factor includes the two connectors 104a–104b of the 3U form factor, and three additional 2 mm connectors 104c–104e. In other words, the 3U form factor includes connectors 104a–104b, and the 6U form factor includes connectors 104a–104e. The three additional connectors 104c–104e of the 6U form factor can be used for secondary buses (i.e., Signal Computing System Architecture (SCSA) or MultiVendor Integration Protocol (MVIP) telephony buses), bridges to other buses (i.e., Virtual Machine Environment (VME) or Small Computer System Interface (SCSI)), or for user specific applications. Note that the CPCI specification defines the locations for all the connectors 104a–104e, but only the signal-pin assignments for the CPCI bus portion 104a and 104b are defined. The remaining connectors are the subjects of additional specification efforts, or can be user defined for specific applications, as described above.

Figure 3:
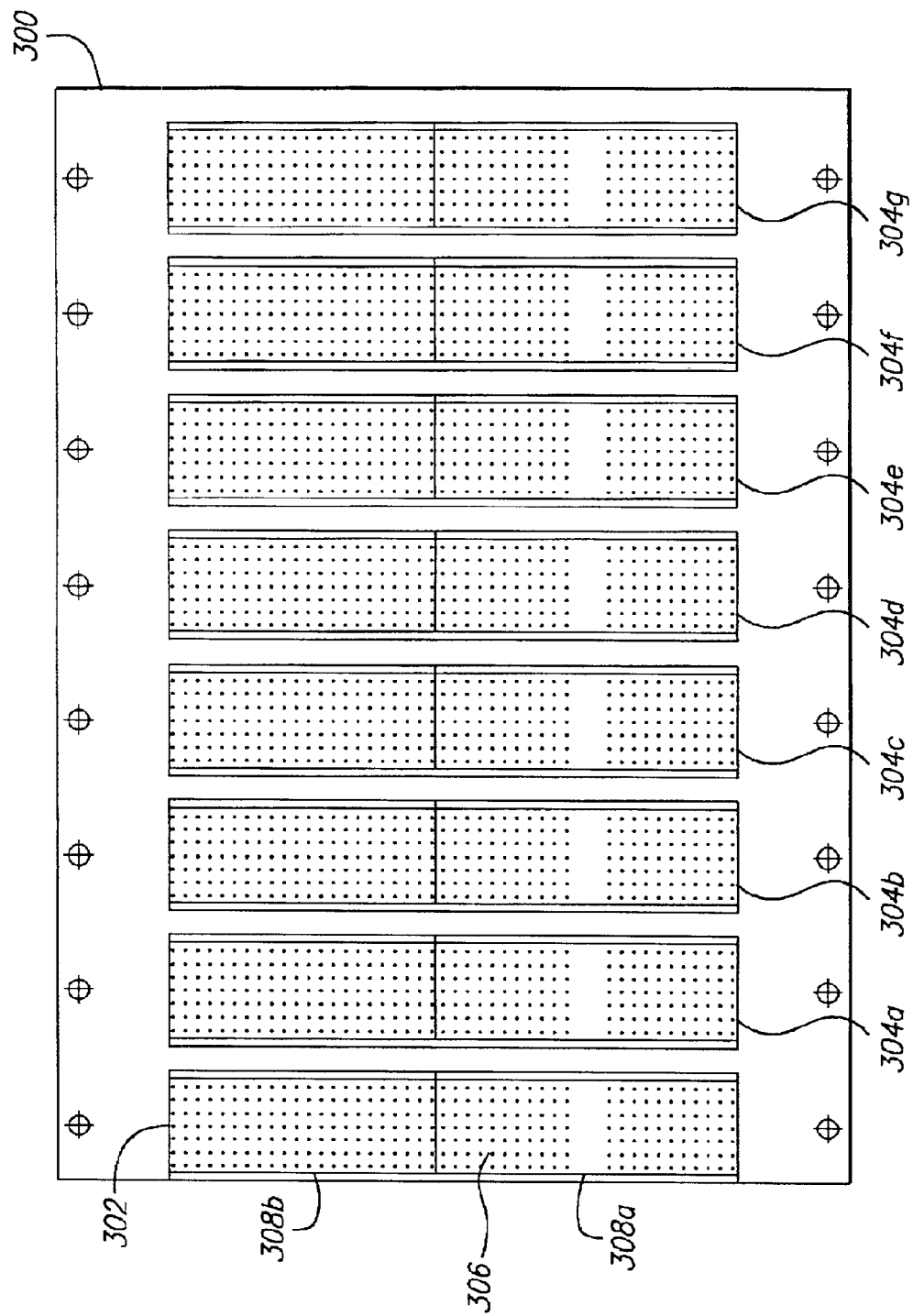
FIG. 3 is a front view of a conventional 3U backplane having eight slots with two connectors each.

Referring to FIG. 3, there is shown a front view of a conventional 3U backplane having eight slots with two connectors each. A CPCI system includes one or more CPCI bus segments, where each bus segment includes up to eight CPCI card slots. Each CPCI bus segment includes one system slot 302, and up to seven peripheral slots 304a–304g. The CPCI daughter card for the system slot 302 provides arbitration, clock distribution, and reset functions for the CPCI peripheral cards on the bus segment. The peripheral slots 304a–304g may contain simple cards, intelligent slaves or PCI bus masters.

The connectors 308a, 308b have connector-pins 306 that project in a direction perpendicular to the backplane 300, and are designed to mate with the front side "active" daughter cards ("front cards"), and "pass-through" its relevant interconnect signals to mate with the rear side "passive" input/output (I/O) card(s) ("rear transition cards"). In other words, in the conventional CPCI system, the connector-pins 306 allow the interconnected signals to pass-through from the front cards to the rear transition cards.

Figure 4B:
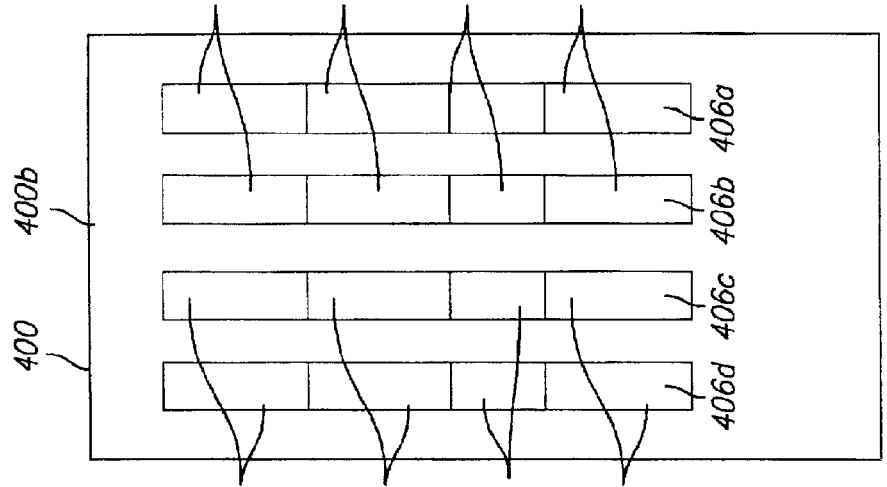
FIG. 4(b) shows a back view of a conventional CPCI backplane in the 6U form factor.
Figure 4A:
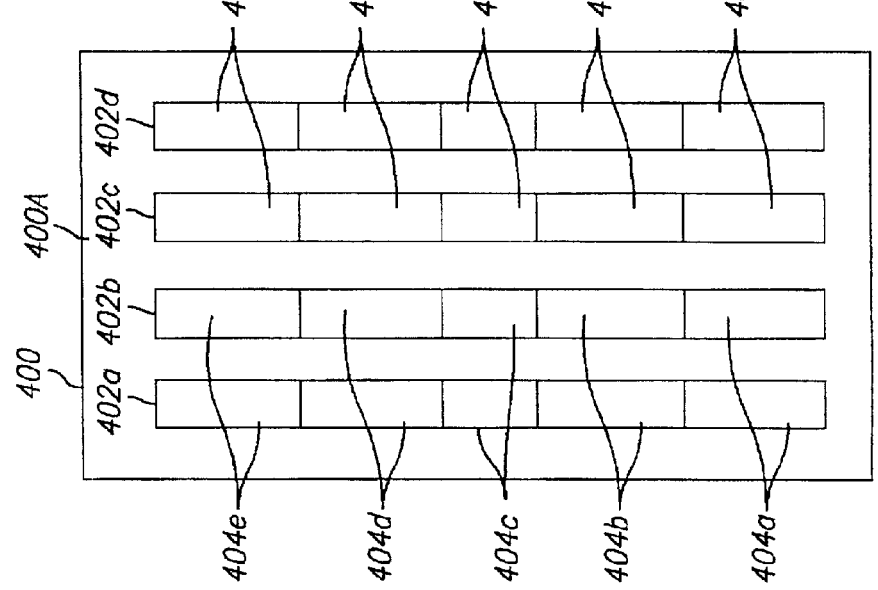
FIG. 4(a) shows a front view of a conventional CPCI backplane in the 6U form factor.

Referring to FIGS. 4(a) and 4(b), there are shown a front and back view of a conventional CPCI backplane in the 6U form factor, respectively. In FIG. 4(a), four slots 402a–402d are provided on the front side 400a of the backplane 400. In FIG. 4(b), four slots 406a–406d are provided on the back side 400b of the backplane 400. Note that in both FIGS. 4(a) and 4(b) only four slots are provided instead of eight slots as in FIG. 3. Further, it is important to note that each of the slots 402a–402d on the front side 400a has five connectors 404a–404e while each of the slots 406a–406d on the back side 400b has only four connectors 408b–408e. This is because, as in the 3U form factor of the conventional CPCI system, the 404a connectors are provided for 32 bit PCI and connector keying. Thus, they do not have I/O connectors to their rear. Accordingly, the front cards that are inserted in the front side slots 402a–402d only transmit signals to the rear transition cards that are inserted in the back side slots 406a–406d through front side connectors 404b–404e.

Figure 5:
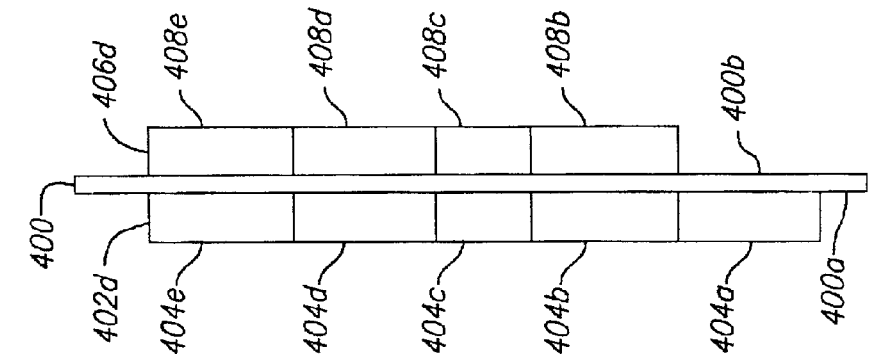
FIG. 5 shows a side view of the conventional backplane of FIGS. 4(a) and 4(b)

Referring to FIG. 5, there is shown a side view of the conventional backplane of FIGS. 4(a) and 4(b). As shown in FIG. 5, slot 402d on the front side 400a and slot 406d on the back side 400b are arranged to be substantially aligned so as to be back to back. Further, slot 402c on the front side 400a and slot 406c on the backside 400b are arranged to be substantially aligned, and so on. Accordingly, the front side connectors 404b–404e are arranged back-to-back with the back side connectors 408b–408e. Note that the front side connector 404a does not have a corresponding back side connector. It is important to note that the system slot 402a is adapted to receive the CPU front card, and the signals from the system slot 402a are then transmitted to corresponding connector-pins of the peripheral slots 402b–402d. Thus, the conventional CPCI system can have expanded I/O functionality by adding peripheral front cards in the peripheral slots 402b–402d.

FIGS. 6(a) and 6(b) illustrate a conventional pin out arrangement of the connectors in a CPCI system. Specifically, FIG. 6(a) shows a front view of a conventional pin out arrangement of the connectors of a slot. Referring to FIG. 6(a), there are shown connectors 404a–404e of slot 402d. The connector-pins are arranged in a column and row configuration. Each of the connectors 404a–404e has seven columns of pins, which are designated as Z, A, B, C, D, E, and F going from left to right. Each of the connectors 404a–404e also has twenty-two rows of connector-pins.

As shown in FIG. 6(a), all of the connector-pins in the Z and F columns are connected to a ground layer GND in the backplane. The connector-pins of the other columns A, B, C, D, and E are connected to various other CPCI signals including ground. Note that in FIG. 6(a), the connector-pins having XXX or YYY designations do not mean that those pins share the same signals, respectively. Instead, the XXX or YYY designations are provided to show that these connector-pins are defined to carry various CPCI signals that are not particularly relevant to the present invention, and thus are not specifically shown in FIG. 6(a). Note that the other slots 402a–402c have a similar pin out arrangement as shown in slot 402d of FIG. 6(a).

FIG. 6(b) shows a back view of a conventional pin out arrangement of the connectors of a slot. Referring to FIG. 6(b), there are shown connectors 408b–408e of slot 406d. Note that the back view shows only four connectors instead of five. This is because, as shown in FIGS. 4(a) and 4(b), the front side of the backplane has five connectors while the back side of the backplane has four connectors. Further, the column arrangement of the connector-pins is designated as F, E, D, C, B, A, and Z going from left to right. This is because the connector-pins of slots 402d and 406d are straight-pass through pins, and so the column designations are mirror images with respect to each other. For example, the connector-pin located at column A, row 2 of connector 404b is the same connector-pin located at column A, row 2 of connector 408b. Also, similar to FIG. 6(a), connector-pins located at columns F and Z in FIG. 6(b) are connected to a ground layer GND in the backplane. Likewise, connector-pins of columns A, B, C, D, and E are connected to various signals, as in FIG. 6(a).

More specifically, the Hot Swap/HA specification defines the connector-pin located at column D, row 15 of connector 404(a) to be a BD_SELECT# pin. Other relevant connector-pins of connector 404a include a BD_HEALTHY# pin, which is located at column B, row 4, and a BD_RESET# pin, which is located at column C, row 5.

Figure 7:
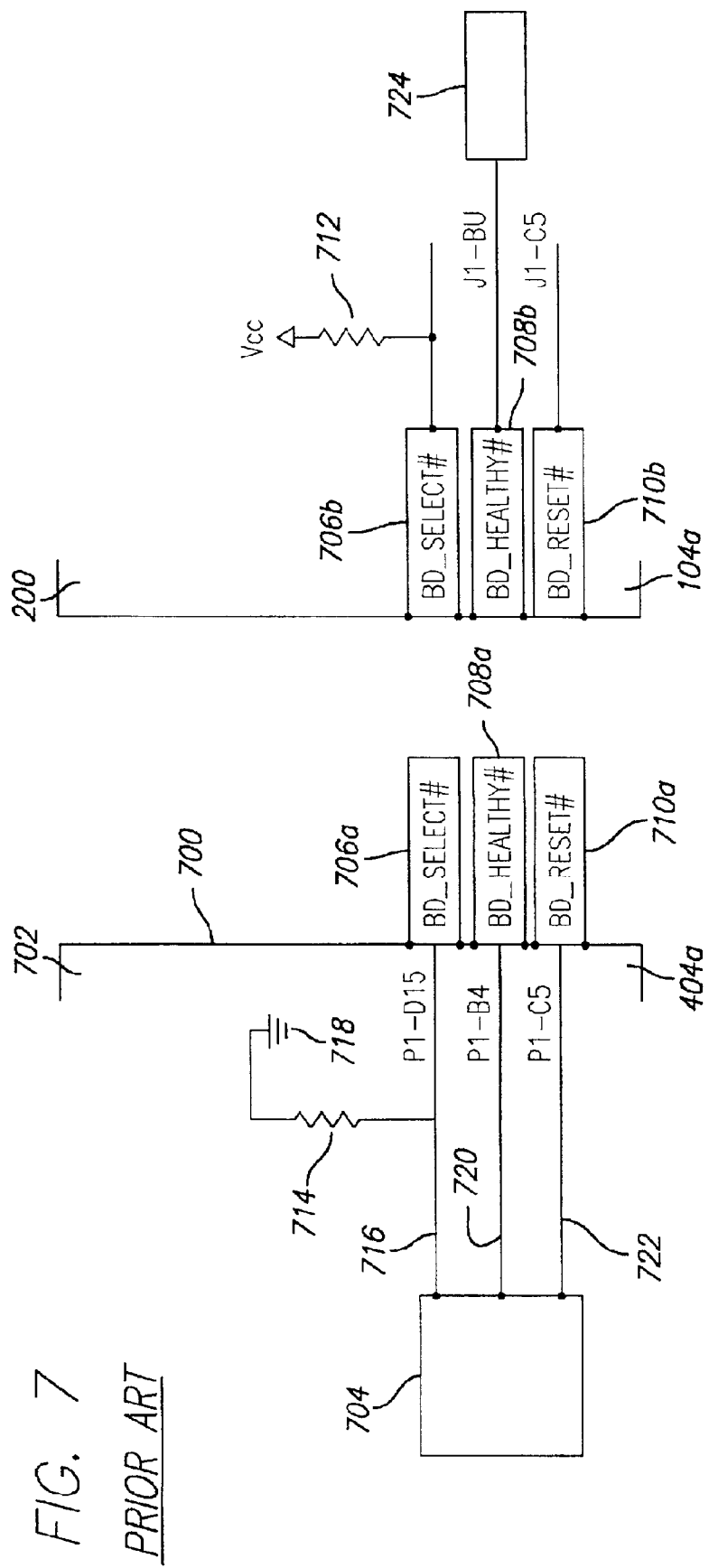
FIG. 7 shows a conventional hot swappable CPCI system for detecting the presence of a hot swappable front card.

FIG. 7 shows a conventional hot swappable CPCI system for detecting the presence of a hot swappable front card. Referring to FIG. 7, a CPCI backplane 700 has a connector 404a in a slot 702, and a hot swap controller 704 coupled to the backplane 700. The connector 404a has the BD_SELECT# 706a, BD_HEALTHY# 708a, and BD_RESET# 710a connector-pins, which are of male-type, connected to the hot swap controller 704. Note that the BD_SELECT# line 716 is connected to a "weak-pull-down" resistor 714 that is connected to a ground layer 718 in the backplane 702. A front card 200 has corresponding BD_SELECT# 706b, BD_HEALTHY# 708b, and BD_RESET# 710b connector-pins, which are of female-type, with the BD_SELECT# pin 706b being connected to a voltage source Vcc through a pull-up resistor 712. The BD_SELECT# line 716 is an input/output line and is defined to provide a signal to the hot swap controller 704 such that the controller 704 knows whether a hot swappable front card has been inserted in a particular slot. Further, the hot swap controller 704 performs the powering up/down of the hot swappable front card using this line 716. The BD_HEALTHY# pin 708b is connected to an internal power supply 724 in the front card 200. Accordingly, the BD_HEALTHY# line 720 is an input line and is used to indicate to the hot swap controller 704 whether or not the board is defective. The BD_RESET# line 722 is an input/output line and is used by the hot swap controller 704 to reset the front card if it is to remain in a backup mode. All of the above described functions of the BD_SELECT#, BD_HEALTHY#, and BD_RESET# lines are described in more detail below.

Specifically, when the hot swappable front card 200 is inserted into a slot of the backplane 702 such that the connectors 404a and 104a mate, the BD_SELECT# pin 706a is pulled up to the voltage level of the BD_SELECT# pin 706b. This pull-up on the BD_SELECT# pin 706a is detected by the hot swap controller 704 such that the hot swap controller 704 senses that a hot swappable front card 200 has been inserted in the particular slot 702. The hot swap controller 704 then drives the BD_SELECT# line 716 low so as to allow the front card to power up. Then, the hot swap controller 704 examines the BD_HEALTHY# line 720 to determine if the inserted front card 200 is healthy. This determination is made by sensing the voltage level from the internal power supply 724. The hot swap controller then drives the BD_RESET# line 722 high to release the front card from the reset mode and to connect to the system, or if the front card is a backup board, then the BD_RESET# line 722 is driven low to maintain the front card 200 in the reset mode until backup is needed from the front card 200.

As described above, the BD_HEALTHY# 710 line is an input line whereas the BD_SELECT# line 716 and BD_RESET# line 722 are input/output lines. In other words, the hot swap controller 704 must drive the BD_SELECT# line 716 and BD_RESET# line 722 in order for the front card 200 to operate properly. Accordingly, in the conventional CPCI system of FIG. 7, if the hot swap controller 704 is defective and needs replacement, then powering-down of the system is required since no backup hot swap controller is provided to drive the BD_SELECT# line 716 and BD_RESET# line 722.

Figure 8A:
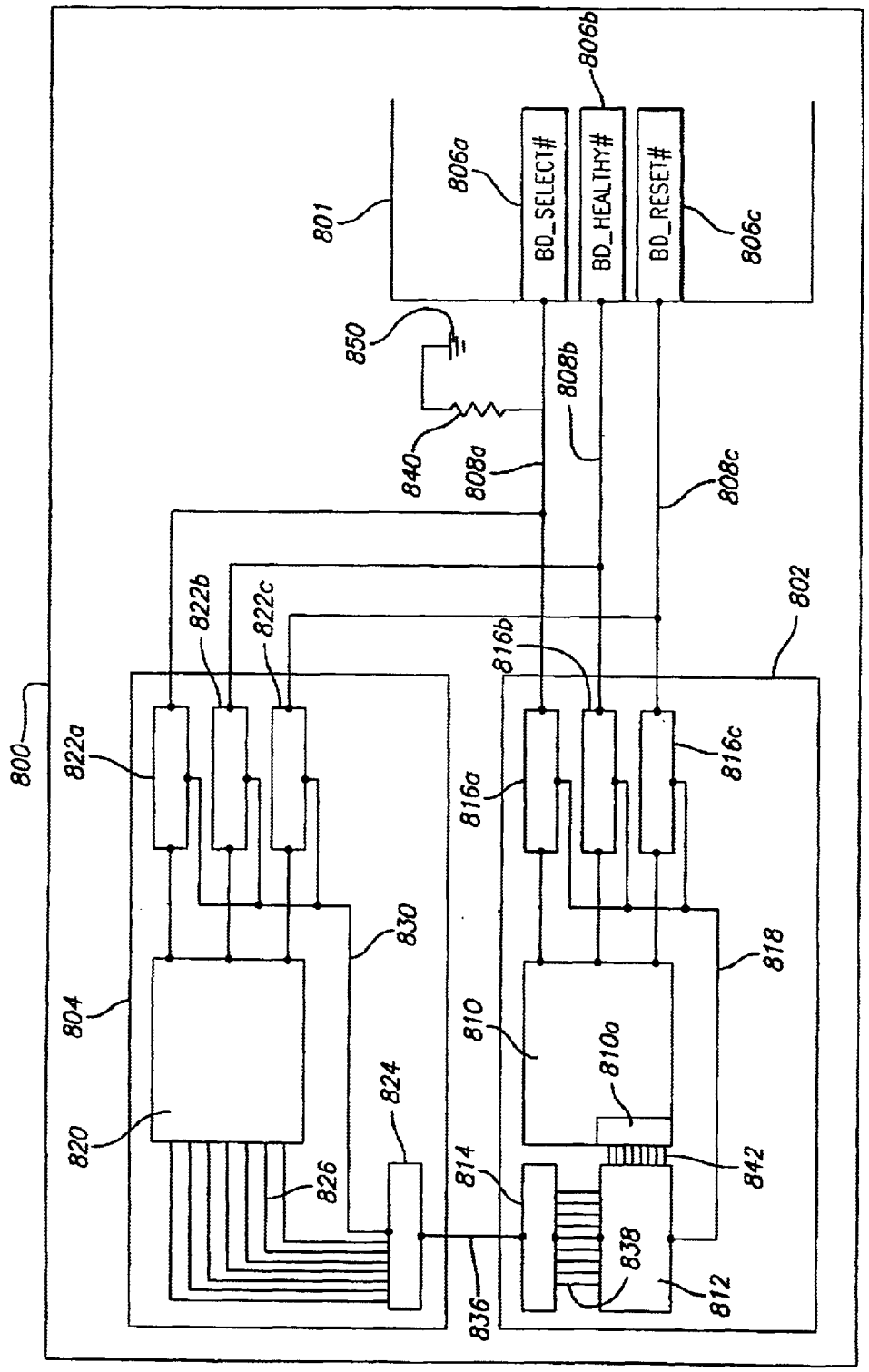
FIG. 8(a) shows a CPCI system for dynamic replacement of a hot swap controller according to an embodiment of the invention.

FIG. 8(a) shows a CPCI system adapted for dynamic replacement of a hot swap controller according to an embodiment of the invention. Referring to FIG. 8(a), a backplane 800 has a hot swap controller 802 and a standby circuitry 804, with the hot swap controller 802 connected to BD_SELECT# 806a, BD_HEALTHY# 806b, and BD_RESET# 806c connector-pins of slot 801 via the signal lines 808a–808c, respectively. The primary hot swap controller 802 has a core control circuit 810 including a register 810a for storing the status of the signal lines 808a–808c, an arbitration control circuit 812, a communication control circuit 814, and switches 816a–816c. The core control circuit 810 is connected to the BD_SELECT# 806a, BD_HEALTHY# 806b and BD_RESET# 806c connector-pins through the switches 816a–816c via the signal lines 808a–808c, respectively. The BD_SELECT# line 808a is connected to a ground 850 in the backplane 800 through a "weak-pull-down" resistor 840. The arbitration control circuit 812 simultaneously enables/disables the switches 816a–816c by transmitting a control signal through a common control line 818, and is also connected to the core control circuit 810 via a plurality of control lines 842. The communication control circuit 814 is connected to the arbitration control circuit 812 via a plurality of control lines 838. Although eight control lines 838, 842 are illustrated in FIG. 8, the control lines 838, 842 may include more or less than illustrated.

The backup hot swap controller 804 includes a register 820, switches 822a–822c, and a communication control circuit 824. The register 820 is connected to the BD_SELECT# 806a, BD_HEALTHY# 806b and BD_RESET# 806c connector-pins through the switches 822a–822c via the signal lines 808a–808c, respectively. The communication control circuit 824 simultaneously enables/disables the switches 822a–822c by transmitting a control signal through a common control line 830. The communication control circuit 824 is also connected to the register 820 via a plurality of signal lines 826. In the embodiment shown in FIG. 8(a), the signal lines 826 include four data lines, two control lines, and a read/write enable line, but may include more or less signal lines than are illustrated in FIG. 8(a).

As described above, the core control circuit 810 in the primary hot swap controller 802 monitors the BD_SELECT# line 808a and drives it active if board presence is detected. It then monitors the BD_HEALTHY# line 808b and drives the BD_RESET# line 808c accordingly. For example, if BD_HEALTHY# 808b is true, which means that the card is healthy, then the BD_RESET# line 808c is driven to be inactive such that the card comes "on line" in the CPCI system. Alternatively, if the BD_HEALTHY# line 806b is false, then the BD_RESET# line 808c is driven to be active such that the card remains "off line" in the CPCI system. In a High-Availability ("HA") environment, even if the BD_HEALTHY# line is true, the primary hot swap controller 802 may continue to hold the particular BD_RESET# line 808c active such that the particular card acts as a backup and only comes on line if the main card has failed. Further, although not shown in FIG. 8(a), the CPCI specification defines an ENUM# line that the primary hot swap controller monitors and notifies the CPU when true to indicate that a new card has been inserted and is ready to be initialized, or a card is about to be removed in order to deassert the BD_SELECT# line 808a and BD_RESET# line 808c and update the system's configuration files. Accordingly, the primary hot swap controller 802 requires relatively complex circuitry and most implementations are CPU based. In contrast, the backup hot swap controller 804 only has to retain the BD_SELECT# 808a and BD_RESET 808c lines undisturbed while the primary hot swap controller 802 is being replaced, and so is a simpler circuit than the primary hot swap controller 802.

Figure 8B:
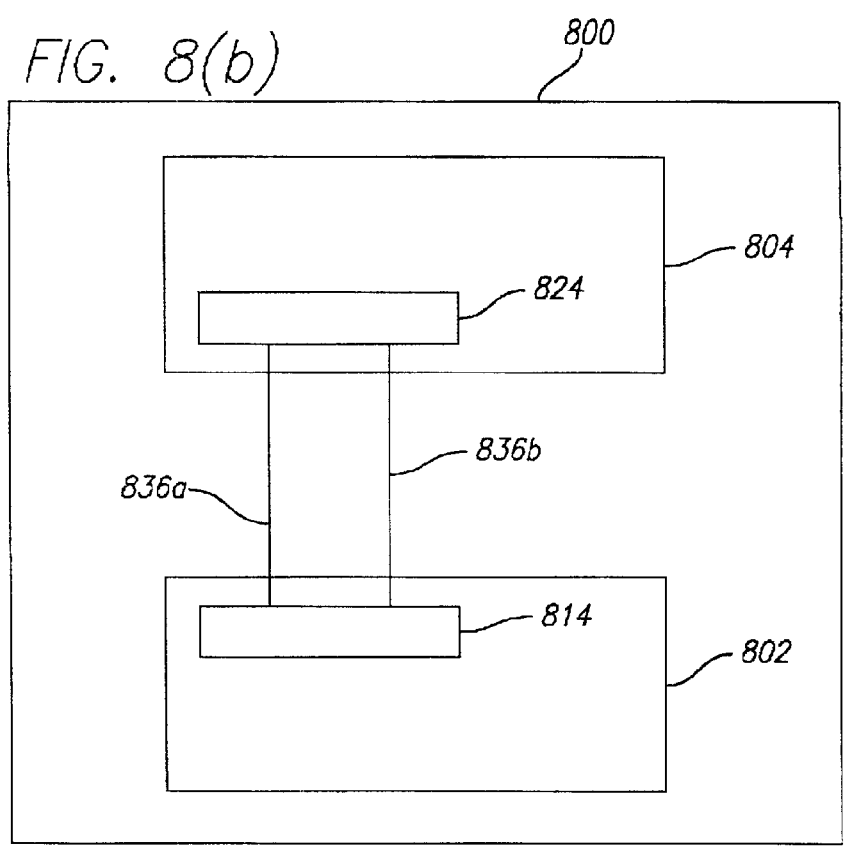
FIG. 8(b) illustrates an asynchronous interface for the communication control circuits according to an embodiment of the invention.

To allow communication between the primary hot swap controller 802 and the backup hot swap controller 804, the respective communication control circuits 814, 824 are connected by a communication link 836. FIG. 8(b) shows a communication link having an asynchronous serial interface according to an embodiment of the invention. Referring to FIG. 8(b), the communication link 836 includes two signal lines 836a, 836b, which connects the respective communication control circuits 814, 824. Typically, the signal line 836a is a data line and the signal line 836b is a clock line. Accordingly, the communication control circuits 814, 824 may have an asynchronous serial link such as I2C, universal serial bus ("USB"), or Recommended Standard-232 ("RS232"), which is a TIA/EIA standard for serial transmission between computers and peripheral devices (modem, mouse, etc.).

Figure 8C:
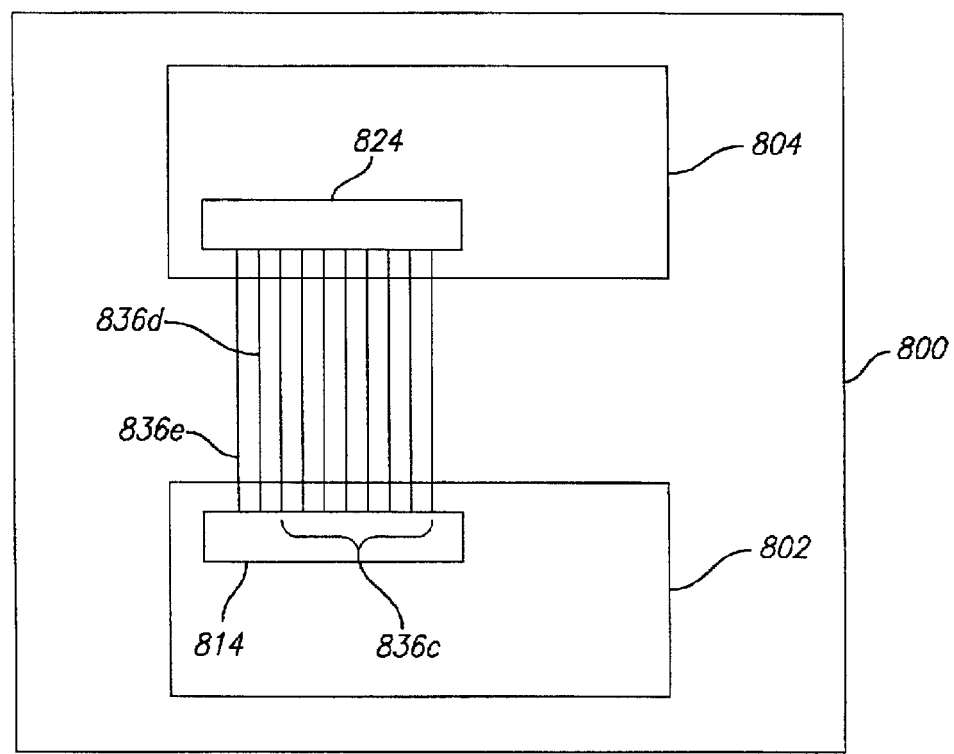
FIG. 8(c) shows a synchronous interface for the communication control circuits according to an embodiment of the invention.

Alternatively, FIG. 8(c) shows a communication link having a synchronous parallel interface according to an embodiment of the invention. The communication link 836 between the communication control circuits 814, 824 is a synchronous link having a parallel interface of multiple data lines, a select/strobe control line, and a read/write control line. As shown in FIG. 8(c), the respective communication control circuits 814, 824 share ten signal lines. The first eight lines 836c are data lines, the control line 836d is a chip select/strobe control line, and the control line 836e is a read/write control line.

Referring back to FIG. 8(a), during normal operation, the arbitration control circuit 812 has the switches 816a–816c of the primary hot swap controller 802 enabled, and the communication control circuit 824 has the switches 822a–822c of the backup hot swap controller 804 disabled. After the inserted front card has been determined to be healthy as described above, the hot swap controller 802 drives the BD_SELECT# line 808a and the BD_RESET# line 808c with appropriate output voltages. With respect to the BD_RESET# line 808c, the hot swap controller 802 drives the BD_RESET# line 808c high to connect to the system, or in the HA environment, if the front card is a backup card, then the BD_RESET# line 808c is driven low to maintain the front card in the reset mode until the backup card is needed.

During this time, at programmed intervals, for example, every second, the arbitration control circuit 812 receives the status of the lines 808a–808c from the core control circuit 810, and invokes the communication circuit 814 to pass this data to the register 820. Specifically, the communication control circuit 814 transmits this data to the communication control circuit 824 via the communication link 836. The communication control circuit 824 transmits this data to the register 820 where it is stored until the next update.

To replace the defective primary hot swap controller 802, a user unlatches an ejector lodge (not shown) on the primary hot swap controller card and ejects the card. If the primary hot swap controller 802 is defective, then a signal is sent from the core control circuit 810 to the arbitration section 812 to indicate that the hot swap controller 802 is defective. The status of the lines 808a–808c and the defective state of the primary hot swap controller 802 is transmitted by the communication control circuit 814 of the primary hot swap controller 802 to the communication control circuit 824 of the backup hot swap controller 804. Then, the communication control circuit 824 enables the switches 822a–822c of backup hot swap controller 804 while the switches 816a–816c of the primary hot swap controller 802 are disabled by the arbitration control circuit 812. The register 820 then drives the lines 808a–808c according to the state of the lines 808a–808c stored in the register 820. More specifically, the register 820 only drives the BD_SELECT# 808a and BD_RESET 808c lines since BD_HEALTHY# line 808b is merely an input line. Accordingly, the backup hot swap controller 804 maintains the state of the lines 808a–808c in order to allow replacement of the defective primary hot swap controller 802.

After a replacement primary hot swap controller card is inserted in the system, and powered-up, the communication control circuit 824 of the backup hot swap controller 824 transmits the state of the lines 808a–808c stored in the register 820 to the communication control circuit 814 of the primary hot swap controller 802. The communication control circuit 814 then transmits this information to the arbitration control circuit 838, which stores this information in the register 810a of the core control circuit 810. The arbitration section 812 enables the switches 816a–816c, and the communication control circuit 824 of the backup hot swap controller 804 disables the switches 822a–822c. The core control circuit 810 then drives the lines 808a–808c according to the information stored in register 810a. Thereafter, the status of the lines is then transmitted at each programmed interval to the backup hot swap controller 804 as described above.

Figure 9:
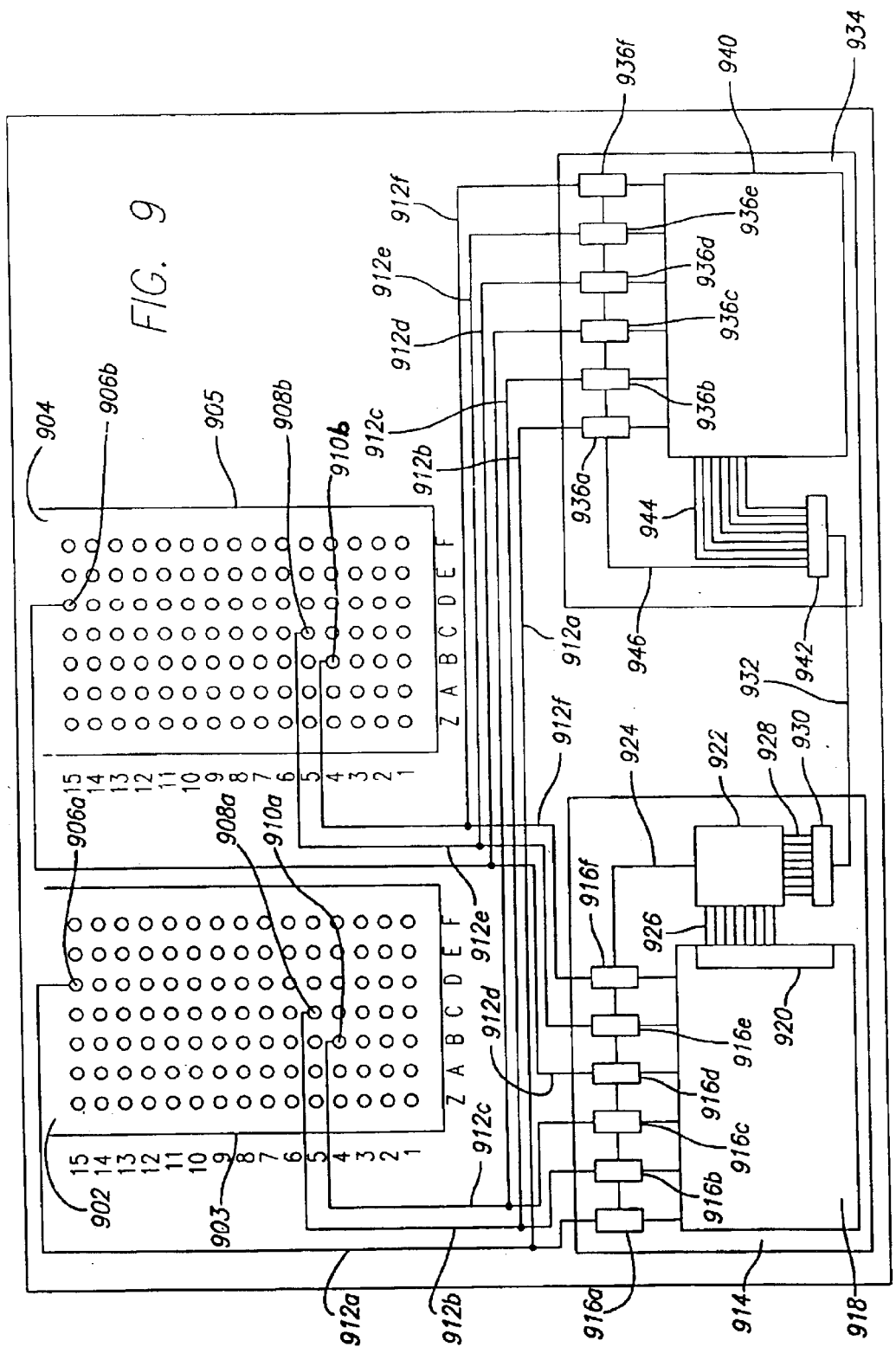
FIG. 9 shows various connector-pins of certain slots connected to the primary and backup hot swap controllers according to an embodiment of the invention.

FIG. 9 shows a plurality of slots of a backplane connected to the primary and backup hot swap controllers according to an embodiment of the invention. Referring to FIG. 9, a backplane 900 has two slots 902, 904 with respective connectors 903, 905. Note that only two slots are shown for illustrative purposes only and the backplane 900 would preferably include more slots. The connectors 903, 905 have various connector-pins for mating with a front card (not shown). The relevant connector-pins in the present invention include the BD_SELECT# pins 906a, 906b, BD_RESET# pins 908a, 908b, and BD_HEALTHY# pins 910a, 910b. In the backplane 900 are signal traces 912a–912f for connecting the connector-pins to a primary hot swap controller 914 and a backup hot swap controller 934.

The primary hot swap controller 914 includes a core control circuit 918 having a register 920, an arbitration control circuit 922, a communication control circuit 930 and switches 916a–916f. The switches 916a–916f are connected to the core control circuit 918 and are enabled/disabled simultaneously by the arbitration control circuit 922, which transmits a control signal on a common control line 924 to respective activation terminals of the switches 916a–916f. The arbitration control circuit 922 is also connected to the core control circuit 918 and the communication control circuit 930 via signal lines 926 and 928, respectively. The communication control circuit 930 is used by the primary hot swap controller 914 to communicate with the backup hot swap controller 934 via a communication link 932.

The backup hot swap controller 934 includes a register 940, switches 936a–936f, and a communication control circuit 942. The communication control circuit 942 is used by the backup hot swap controller 934 to receive data concerning the slots 902, 904 from the communication control circuit 930 of the primary hot swap controller 914. The communication control circuit 942 is connected to the register 940 via signal lines 944. The communication control circuit 942 also has a common control line 946 that is connected to the activation terminals of the switches 936a–936f for turning on/off of the switches.

As shown in FIG. 9, the BD_SELECT# pin 906a is connected to the core control circuit 918 and the register 940 via signal line 912a through switches 916a and 936a, respectively. The BD_HEALTHY# pin 908a is connected to the core control circuit 918 and the register 940 via signal line 912b through switches 916b and 936b, respectively. The BD_RESET# pin 910a is connected to the core control circuit 918 and the register 940 via signal line 912c through switches 916*c* and 936*c*, respectively. Similarly, the BD_SELECT# pin 906*b* is connected to the core control circuit 918 and the register 940 via signal line 912*d* through switches 916*d* and 936*d*, respectively. The BD_HEALTHY# pin 908*b* is connected to the core control circuit 918 and the register 940 via signal line 912*e* through switches 916*e* and 936*e*, respectively. The BD_RESET# pin 910*b* is connected to the core control circuit 918 and the register 940 via signal line 912*f* through switches 916*f* and 936*f*, respectively.

As for the operation of the primary hot swap controller 914 and the backup hot swap controller 934 in FIG. 9, they operate as described above for the system shown in FIG. 8(*a*), except that more switches 916*a–f*, 936*a–f* are enabled/disabled and more lines 912*a–f* are monitored and driven in the present embodiment. Accordingly, the present embodiment is able to drive multiple slots having hot swappable cards while the primary hot swap controller card is being replaced.

Having thus described embodiments of the present invention, it should be apparent to those skilled in the art that certain advantages of the within system have been achieved. It should also be appreciated that various modifications, adaptations, and alternative embodiments thereof may be made within the scope and spirit of the present invention. For example, a CPCI system adapted for dynamic replacement of a hot swap controller has been illustrated, but it should be apparent that the inventive concepts described above would be equally applicable to other types of busses and computer systems. The invention is further defined by the following claims.

What is claimed is:

1. A computer system including a circuit board, the computer system comprising:
   a first slot and a second slot coupled to the circuit board, the first slot including a first connector and the second slot including a second connector, the first and second connectors each configured for connecting to a plurality of signal lines;
   a hot swap controller connected to the circuit board, the hot swap controller comprising a first means for switching a first plurality of switches, a second means for driving and monitoring signal lines connected to connectors of the first slot and the second slot, and a third means for storing a status information of the signal lines;
   standby circuitry removably connected to the hot swap controller, the standby circuitry comprising a fourth means for switching a second plurality of switches, and a fifth means for maintaining the signal lines according to stored status information of the signal lines received from the hot swap controller,
   wherein, during a normal operation of the hot swap controller, the first means turns on the first plurality of switches such that the second means monitors and drives ones of the signal lines and the fourth means turns off the second plurality of switches, and during a standby operation of the hot swap controller, the fifth means maintains a status of the signal lines according to the status information stored in the fifth means without monitoring the status of the signal lines, such that when normal operation of the hot swap controller is restored, prior status of the signal lines is recoverable from the standby circuitry.

2. The computer system of claim 1, the hot swap controller includes a first communication control circuit, the second means connected to the first plurality of switches and to the first means, the first means connected to activation terminals of the first switches via a first control line for switching the first plurality of switches, the communication control circuit connected to the first means, and the connectors for the signal lines connected to the second means through respective ones of the first plurality of switches.

3. The computer system of claim 2, wherein the fifth means is connected to the second plurality of switches and to the fourth means, the fourth means is connected to respective activation terminals of the second switches via a second control line for switching the second plurality of switches, the fourth means having a communication link with the first communication control circuit, and the connectors for the signal lines connected to the fifth means through respective ones of the second plurality of switches.

4. The computer system of claim 3, wherein the communication link connecting the first communication control circuit and the fourth means comprises an asynchronous communication link.

5. The computer system of claim 3, wherein the communication link connecting the first communication control circuit and the fourth means comprises a synchronous communication link.

6. The computer system of claim 2, wherein during every programmed interval of the normal operation, the status of selected ones of the signal lines connected to connectors are transmitted from the first communication control circuit to the fourth means and stored in the fifth means.

7. The computer system of claim 2, wherein the first communication control circuit is connected to the first means via a plurality of control lines.

8. The computer system of claim 1, wherein the first means includes an arbitration control circuit, the second means includes a core control circuit, and the third means includes a first register.

9. The computer system of claim 1, wherein the fourth means includes a second communication control circuit, the fifth means includes a second register.

10. The computer system of claim 1, wherein the first means is connected to the second means via a plurality of control lines.

11. The computer system of claim 1, wherein the fourth means is connected to the fifth means via a plurality of signal lines.

12. A hot swappable computer system including a circuit board, the circuit board having a slot with a first connector for connecting to signal lines of a plug-in card, the computer system comprising:
   a hot swap controller connected to a circuit board of the computer system, the hot swap controller comprising a core control circuit including a first register, a plurality of first switches, a first communication control circuit, and an arbitration control circuit, the core control circuit connected to the plurality of first switches and the arbitration control circuit, the arbitration control circuit connected to the first communication control circuit and to activation terminals of the first switches via a common control line, the core control circuit configured to monitor a status of at least one of the signal lines and to alert a CPU of the computer system when a change in the status occurs;
   standby circuitry connected to the hot swap controller, the standby circuitry comprising having a second register, a plurality of second switches, and a second communication control circuit, the second register connected to the second switches and the second communication control circuit, the second communication control circuit connected to respective activation terminals of the second switches via a common control line and to the first communication control circuit via a communication link, wherein during a normal operation of the hot swap controller, the hot swap controller monitors and drives the signal lines, and during a backup operation of the hot swap controller, the standby circuitry maintains a status of the respective signal lines in the second register without monitoring the signal lines, such that when normal operation of the hot swap controller is restored, prior status of the signal lines is recoverable from the standby circuitry.

13. The computer system of claim 12, wherein the communication link connecting the first and second communication control circuits comprises an asynchronous communication link.

14. The computer system of claim 12, wherein the communication link connecting the first and second communication control circuits comprises a synchronous communication link.

15. The computer system of claim 12, wherein at programmed intervals of the normal operation, the status of the signal lines connected to the first through third connector-pins are transmitted from the first communication control circuit to the second communication control circuit and stored in the second register.

16. The computer system of claim 12, wherein the arbitration control circuit is connected to the first communication control circuit via a plurality of control lines.

17. The computer system of claim 12, wherein the arbitration control circuit is connected to the core control circuit via a plurality of control lines.

18. The computer system of claim 12, wherein the second communication control circuit is connected to the second register via a plurality of signal lines.

19. Standby circuitry for use with a hot swap controller to enable hot-swapping of the hot-swap controller in a computer system that comprises a circuit board having slots for plug-in cards of the system, the standby circuitry comprising:

a plurality of switches, respective ones of the plurality of switches configured for switching a connection to individual terminals of at least one computer system slot, wherein the individual terminals are designated for determining status of a plug-in card;

a register configured for storing status information of the terminals, and connected to the plurality of switches; and a communication control circuit connected to the register, the communication control circuit connected to respective activation terminals of the switches and having a common control line for switching the plurality of switches;

wherein the standby circuitry is configured such that, when the communication control circuit is commanded to turn on the switches prior to beginning standby operation of the hot swap controller, the register thereafter maintains the terminals in a predetermined state according to the status stored in the register without monitoring the terminals of the computer system slot, until normal operation of the hot swap controller is restored.

20. The standby circuitry of claim 19, further comprising a port for a serial communication link to the hot swap controller.

21. The standby circuitry of claim 19, wherein the terminals of the computer system slot comprise designated terminals under a CPCI standard selected from the group consisting of BD_SELECT, BD_RESET and BD_HEALTHY.

22. The standby circuitry of claim 19, wherein the plurality of switches are connected to the individual terminals for a plurality of slots of the computer system, wherein at least some of the individual terminals are designated for determining a status of a respective plug-in card.

23. The standby circuitry of claim 19, further comprising a port for a communication link to the hot swap controller that is separate from the circuit board of the computer system.

24. The standby circuitry of claim 19, the standby circuitry is configured to maintain status terminals of a CPCI system in a state predetermined by the hot swap controller while the hot swap controller is taken off-line.

* * * * *